United States Patent

[11] 3,632,360

[72] Inventor Glenn H. Lufcy
 Tiffin, Ohio
[21] Appl. No. 793,892
[22] Filed Jan. 24, 1969
[45] Patented Jan. 4, 1972
[73] Assignee Basic Incorporated
 Cleveland, Ohio

[54] REFRACTORY COMPOSITION AND METHOD FOR THE PRODUCTION OF CERAMICALLY BONDED REFRACTORIES
 13 Claims, No Drawings
[52] U.S. Cl. ..................................................... 106/58, 106/63
[51] Int. Cl. ..................................................... C04b 35/04, C04b 35/06

[50] Field of Search ............................................ 106/56, 58, 63, 280, 281, 284

[56] References Cited
 UNITED STATES PATENTS
 3,222,196 12/1965 Davies et al. .................. 106/58
 3,256,104 6/1966 Weaver ......................... 106/58

Primary Examiner—James E. Poer
Attorney—Oberlin, Maky, Donnelly and Renner

ABSTRACT: In producing ceramically bonded basic refractories, the basic refractory particles are bonded together with a temporary binder. The temporary binder includes a pitch which may be a tall oil pitch or a fatty acid pitch and an asphalt binder oil.

REFRACTORY COMPOSITION AND METHOD FOR THE PRODUCTION OF CERAMICALLY BONDED REFRACTORIES

This invention relates generally as indicated to a refractory composition and method for the production of ceramically bonded refractories. More particularly, it relates to such a composition and method utilizing a new temporary binder.

Ceramically bonded basic refractories possess much greater strength, particularly at elevated temperatures, than unburned refractories because of the ceramic bond which has been formed during the firing process. The advantages of such refractories for use in oxygen steelmaking furnaces is thus quite apparent, and there is a great demand in the steelmaking industry for ceramically bonded basic refractories of superior strength and satisfactory resistance to hydration.

In the manufacture of ceramically bonded refractories, the refractory particles must be bonded together temporarily to enable the particles to be formed into the desired refractory shape. Because of the tendency of basic refractory materials such as dead-burned dolomite and dead-burned magnesia to hydrate, nonaqueous binders must be used. Examples of such nonaqueous binders which have been previously used include tall oil (U.S. Pat. No. 2,501,336), bituminous, petroleum and fatty acid pitches and mixtures of such materials (U.S. Pat. No. 3,222,196).

Such binders, however, have characteristics which make them unsatisfactory as a universally useful bond for use with all refractory mixes. For example, bituminous pitches have a relatively high fixed carbon content, which is quite difficult to burn out in the firing process to produce a ceramically bonded brick. Petroleum pitches likewise have sufficient quantities of fixed carbon to cause difficulty unless care is taken in the firing process. Fatty acid and tall oil pitches have substantially lower quantities of fixed carbon, but these pitches can be neutralized by basic oxides such as magnesium oxide and calcium oxide to produce metallic soaps and water which are undesirable and must be avoided.

It is accordingly, a principal object of the present invention to provide a composition and method for producing ceramically bonded basic refractories utilizing a nonaqueous temporary binder which has a relatively low fixed carbon content.

It is yet another object of this invention to provide such a composition and method utilizing a temporary binder which is less susceptible to the formation of metallic soaps and water.

A further object of the present invention is the provision of such a composition and method utilizing a temporary binder which has sufficient tack and strength to effectively bind the refractory particles into an integral shape but which can also relatively easily be substantially completely removed in the firing process.

Other objects, features and advantages of this invention will become clear to those skilled in the art after a reading of the following more detailed description.

These and other objects are achieved by the present invention in which a refractory composition and method for the production of ceramically bonded basic refractories are provided in which a temporary binder is used comprising a pitch and an asphalt binder oil. The advantages and features of this invention will be set forth in more detail in the description which follows.

Various basic refractories can be used in the present invention including dolomite, synthetic dolomite, limestone, magnesite, periclase, magnesia and mixtures thereof. Illustrative examples of such basic refractories include those of the following chemical compositions:

| Composition No. 1 | $MgO$ | 95.2% |
|---|---|---|
| | $CaO$ | 2.7% |
| | $SiO_2$ | 1.1% |
| | $Fe_2O_3$ | 0.5% |
| | $Al_2O_3$ | 0.5% |
| Composition No. 2 | $MgO$ | 41.4% |
| | $CaO$ | 57.4% |
| | $SiO_2$ | 0.4% |
| | $Fe_2O_3$ | 0.2% |
| | $Al_2O_3$ | 0.1% |
| Composition No. 3 | $MgO$ | 60.1% |
| | $CaO$ | 38.7% |
| | $SiO$ | 0.7% |
| | $Fe_2O_3$ | 0.2% |
| | $Al_2O_3$ | 0.3% |

As noted above, the binder for the refractory particles includes a pitch and an asphalt binder oil. The pitch may be either a tall oil pitch or a fatty acid pitch as will be described. Tall oil is defined by the Encyclopedia of Chemical Technology as a natural mixture of fatty acids related to oleic acid and rosin acids related to abietic acid, together with nonacidic bodies, and is obtained by acidifying the black liquor skimmings of the alkaline paper pulp industry. The various components of tall oil can be separated by distillation, and the still residue is commonly known as tall oil pitch. Such pitches normally contain from about 13 to about 30 percent rosin acids and from about 40 to about 70 percent fatty acid. The acid number of such pitches normally varies between about 20 to about 75.

Fatty acid pitches are, of course, residual materials obtained in the fractional distillation of various animal and vegetable materials such as lard, tallow, palm oil and other vegetable oils. Typically, fatty acid pitches will contain from about 10 to about 20 percent of free fatty acids and will have an acid number ranging from about 20 to about 40.

The asphalt binder which is used in the present invention is to be distinguished from asphalt pitches since the binder oil contains asphalt rather than a pitch and has less residual carbon and also contains from about 5 to about 60 percent by weight of cylinder lube (lubricating) stock. The binder oil is also preferably air blown, which is believed to oxidize and polymerize the asphalt and remove the volatiles therefrom. Oxidation can be achieved also by blowing in the presence of a catalyst such as ferric sulfate.

A preferred composition of the asphalt binder oil will have a ring and ball melting point temperature within the range of from about 126° to about 153° F. and a viscosity of about 2,000 Saybolt Furol seconds at approximately 300° F. As noted above, the binder oil has a relatively low fixed carbon content, viz a maximum Conradson carbon content of about 25 weight percent (ASTM-D189-58).

The quantity of asphalt binder oil which is used with the tall oil or fatty acid pitch can vary from approximately 10 to about 90 weight percent, based on the total weight of the binder. The preferred range is from approximately 25 to about 75 weight percent, and particularly good results have been obtained when a 50-50 weight percent mixture is used.

Only a small quantity of the temporary binder will be used, normally from about 2½ to about 3½ percent by weight, based on the total weight of the refractory particles. Since the binder must be removed in the firing process which follows, the quantity of the binder need only be sufficient to enable the production of an integral refractory shape. Particularly good results in the present invention have been achieved when the quantity of binder is retained within the preferred range of about 2¾ to about 3¼ percent by weight.

In the production of basic refractory articles according to the present invention, basic refractory particles such as the aforenoted dead-burned dolomite, a dead-burned magnesia or mixtures thereof are admixed with sufficient binder to bind the particles together. After a substantially uniform blend of binder and particles is obtained, the admixture is formed into the desired refractory shape. In a preferred form of the method, the basic refractory particles are preheated to a temperature of about 265° to about 300° F. prior to admixing with the binder.

The binder ingredients, i.e., the pitch and the asphalt binder oil, are preblended prior to admixing with the basic refractory particles. Such preblending is preferably at a temperature of from about 300° to about 350° F. which has been found to facilitate obtaining a substantially uniform blend of the pitch and asphalt binder oil.

After the basic refractory particles have been thoroughly admixed with the binder, which normally requires a mixing time of from about 10 to about 15 minutes, the admixture may be formed into the desired refractory shapes in a hydraulic or mechanical press capable of exerting a pressure of from about 5 to about 7 tons/sq. in.

The refractory shapes may be tempered prior to firing as is known in the industry. The temperature of tempering is preferably within the range of from about 450° to about 575° F., with 550° F. being the preferred temperature. The tempering will normally take from about 10 to about 24 hours, with 16 hours being the preferred time at 550° F.

Approximately 2.75 weight percent, based on the total weight of the refractory particles, of the above-described binder mixture was then admixed with the preheated refractory batches. The batches were then pressed at 7 tons per square inch in a hydraulic press to produce refractory bricks 9 inches × 4½ inches × 3 inches in dimension. The bricks were then tempered for 12 hours at a temperature of 550° F., and were subsequently fired at a temperature of 2,800° F. for 6 hours.

The bulk density of the pressed, tempered and fired brick were determined for each temperature by direct weighing and measurement, and the results are shown in table 1. Kerosene impregnation and displacement data were also taken on the burned brick and the bulk density and apparent porosity are reported in table 2.

TABLE 1

[Bulk density (lbs./ft.³)*]

|   | 150° C. | | | 200° F. | | | 250° F. | | | 300° F. | | |
|---|---|---|---|---|---|---|---|---|---|---|---|---|
|   | Press | Temp. | Fired | Press | Temp. | Fired | Press | Temp. | Fired | Press | Temp. | Fired |
| 1 | 188 | 187 | 186 | 189 | 187 | 187 | 189 | 188 | 187 | 188 | 188 | 186 |
| 2 | 187 | 186 | 185 | 188 | 188 | 187 | 189 | 188 | 187 | 188 | 188 | 186 |
| 3 | 187 | 187 | 185 | 189 | 189 | 187 | 189 | 188 | 187 | 188 | 188 | 187 |
| 4 | 188 | 188 | 187 | 188 | 188 | 188 | 189 | 189 | 187 | 188 | 188 | 187 |
| 5 | 188 | 187 | 186 | 189 | 188 | 187 | 189 | 187 | 187 | 189 | 188 | 187 |
| 6 | 189 | 188 | 187 | 188 | 187 | 187 | 189 | 189 | 187 | 187 | 187 | 186 |
| Average | 188 | 187 | 186 | 189 | 188 | 187 | 189 | 188 | 187 | 188 | 188 | 187 |

* ASTM C 133-55 (1961).

TABLE 2

[Burned brick properties¹ vs. mixing temperature]

|   | 150° F. | | 200° F. | | 250° F. | | 300° F. | |
|---|---|---|---|---|---|---|---|---|
|   | B. density (lbs./ft.³) | App. por. (percent) | B. density (lbs./ft.³) | App. por. (percent) | B. density (lbs./ft.³) | App. por. (percent) | B. density (lbs./ft.³) | App. por. (percent) |
| 1 | 187 | 13.6 | 187 | 13.5 | 187 | 13.6 | 187 | 13.5 |
| 2 | 187 | 13.7 | 187 | 13.5 | 188 | 13.4 | 188 | 13.4 |
| 3 | 187 | 13.6 | 187 | 13.8 | 187 | 13.4 | 187 | 13.6 |
| Average | 187 | 13.6 | 187 | 13.6 | 187 | 13.5 | 187 | 13.5 |

¹ Whole brick tested per ASTM C 20-46 (1961) and modified by using kerosene instead of water.

After tempering the refractory shapes are fired at a higher temperature sufficient to obtain a ceramic bond among the basic refractory particles. The maximum maturing temperature of such firing is normally within the range of from about 2,650° F to about 3,000° F. The entire firing cycle requires from about 48 to about 60 hours. Such firing may take place in commercially available kilns such as periodic bell-type kilns, tunnel kilns and ordinary periodic kilns. During firing, an excess of air is maintained in the kiln to provide an oxidizing atmosphere and until residual carbon has been completely removed by oxidation. Natural gas may be used as the fuel for the kiln.

The invention will be better understood by reference to the following specific but nonlimiting examples.

EXAMPLE I

In this example, a dead-burned magnesia of the following chemical composition was used:

| MgO | 95.2% |
| CaO | 2.7% |
| SiO₂ | 1.1% |
| Al₂O₃ | 0.5% |
| Fe₂O₃ | 0.5% |

Various mixing and pressing temperatures were used, as indicated in the following table, with the batch being preheated to the specified temperature prior to admixing with the binder.

A tall oil pitch having an acid number of 32 and a rosin acid content of 16 percent was preblended with the previously described asphalt binder oil to provide a 50-50 weight percent mixture of the pitch and binder oil. To facilitate blending, the pitch and binder oil were preblended at a temperature of about 300° F.

EXAMPLE II

Three 4,500 pound batches of the dead-burned magnesia of example I were admixed with 2.75 weight percent of the tall oil pitch—asphalt binder oil mixture of example I. The MgO was preheated to 230° to 250° F., and the binder had been preblended at a temperature of 300° F. The batches were then pressed at 6 tons/sq. in. in a mechanical toggle press to produce refractory brick 27 inches × (6–5½) × 3 inches in dimension. The brick were then tempered at a temperature of 550° F. for approximately 12 hours and were thereafter fired at a temperature of 2,800° F. for approximately 6 hours.

The results of example II are shown in tables 3 and 4 which follow:

TABLE 3

|   | Lot number | | | |
|---|---|---|---|---|
|   | (1) | (2) | (3) | (4) |
| Whole brick properties:¹ | | | | |
| Green: | | | | |
|   Weight, lbs | 50.7 | 51.0 | 51.0 | 51.4 |
|   Length, inch | 27.02 | 27.04 | 27.06 | 27.03 |
|   Bulk density, W/M, lbs./ft.³ | 190 | 190 | 190 | 191 |
| Tempered:² | | | | |
|   Weight, lbs | 50.9 | 50.9 | 51.2 | N.D. |
|   Length, inch | 27.02 | 27.05 | 27.08 | N.D. |
|   Bulk density, W/M, lbs./ft.³ | 189 | 188 | 188 | N.D. |
| Burned:³ | | | | |
|   Weight, lbs | | 49.8 | | |
|   Length, inch | | 26.94 | | |
|   Bulk density, W/M, lbs./ft.³ | | 187 | | |
|   M/R, cold, p.s.i | | 2,480 | | |
| Burned brick segments:⁴ | | | | |
|   App. porosity, percent | | 14.0 | | |
|   Bulk density, lbs./ft.³ | | 186 | | |

¹ ASTM C 133-55 (1961) (averages of 4 brick from each production lot).
² Averages of 3 brick from each production lot.
³ ASTM C 133-55 (1961) (averages of 6 brick from production lot 2 only).
⁴ ASTM C 20-46 (1961); modified by using kerosene instead of water (averages of brick from production lot 2 only).

TABLE 4.—INDIVIDUAL BURNED BRICK DATA

| | Specimen number | | | | | |
|---|---|---|---|---|---|---|
| | 1 | 2 | 3 | 4 | 5 | Avg. |
| Whole brick: | | | | | | |
| Bulk density, W/M, p.c.f.[1] | 186 | 187 | 188 | 187 | 187 | 187 |
| M/R, cold, p.s.i. | 2,030 | 3,705 | 2,975 | −2,860 | 3,730 | 3,060 |
| Segments (kerosene displacement): | | | | | | |
| Bulk density, p.c.f.[2] | 187 | 187 | 187 | 185 | 186 | 186 |
| App. porosity, percent | 13.9 | 13.9 | 13.6 | 14.6 | 13.9 | 14.0 |
| 2,700 F M/R, p.s.i.,[3] 1 x 1 in. section | 1,125 | 1,350 | 1,670 | | | 1,380 |

[1] ASTM C 133-55 (1961).
[2] ASTM C 20-46 (1961) modified by using kerosene instead of water.
[3] ASTM C 583-67.

EXAMPLE III

To contrast the improved results of brick produced in accordance with the present invention with those previously known, brick were produced using a binder of Epsom salts—magnesium chloride. In this example, one dead-burned magnesia brick batch of the same weight and chemical composition as example II was used, and brick of the same size as in example II were produced. The batch was not preheated prior to mixing. The batch was immediately pressed into brick formed at 6 tons/sq. in. on a mechanical toggle press after being mixed 5 minutes with the following binder solution.

| | |
|---|---|
| 1.26 wt. % | Epsom Salts |
| 1.02 wt. % | Magnesium Chloride |
| 0.25 wt. % | Sodium Ligno-sulfonate |
| 3.75 wt. % | Water |

The freshly pressed brick were oven dried for about 18 hours at 265° F. and then fired as in example II.

The results of example III are shown in table 5.

TABLE 5.—CHEMICALLY BONDED BRICK AFTER FIRING AT 2,800° F.

| | Specimen number | | | |
|---|---|---|---|---|
| | 1 | 2 | 3 | Avg. |
| Whole brick: | | | | |
| Bulk density, W/M, p.c.f.[1] | 182 | 182 | 181 | 182 |
| M/R, cold, p.s.i. | 755 | 1,385 | 345 | |
| Segments: | | | | |
| Bulk density, p.c.f.[2] | 181 | 181 | 181 | 181 |
| App. porosity, percent | 16.8 | 16.8 | 16.6 | 16.7 |
| 2,700 F M/R, p.s.i.[3] 1 x 1 in. section | | 510 | 470 | 490 |

[1] ASTM C 133-55 (1961).
[2] ASTM C 20-46 (1961) Modified by using kerosene instead of water.
[3] ASTM C 583-67.

As can be observed from a comparison of the results of examples I and II with those of example III, brick produced in accordance with the present invention have mechanical strength and densities which are superior to those of the chemically bonded brick. Also, during tempering and firing of the brick of examples I and II, there was no evidence noted of hydration. Additionally, the fired brick from such examples, upon examination after breaking, were found to be free of any carbon residue from the binder.

It will, of course, be appreciated that the foregoing examples I and II could be repeated herein using other basic refractories and binder mixtures as previously described. In the interest of brevity of disclosure, however, this will not be done, but it is to be understood that these are to be included within the confines of this invention.

Other modes of applying the principle of the invention may be employed, change being made as regards the details described, provided the features stated in any of the following claims, or the equivalent of such, be employed.

I therefore particularly point out and distinctly claim as my invention:

1. A composition for producing basic ceramically bonded refractories consisting essentially of basic refractory particles and at least about 2.5 weight percent binder, based on the weight of the refractory particles, said binder having sufficient tackiness to bind said particles together and maintain said bond at an elevated temperature substantially above room temperature, the binder comprising tall oil pitch and from about 10 to about 90 weight percent of asphalt binder oil having a ring and ball melting point temperature within the range of from about 126° to about 153° F. and a maximum Conradson carbon content of about 25 weight percent.

2. The composition of claim 1 in which from about 2½ to about 3½ weight percent, based on the weight of said refractory particles, of said binder is used.

3. The composition of claim 1 in which said basic refractory particles are selected from the group consisting of dead-burned dolomite, dead-burned magnesia and mixtures thereof.

4. The composition of claim 3 in which said binder is approximately a 50–50 weight percent mixture of said asphalt binder oil and said pitch.

5. A refractory composition for the production of basic ceramically bonded refractories consisting essentially of basic refractory particles selected from the group consisting of dead-burned dolomite, dead-burned magnesia and mixtures thereof, and from about 2½ to about 3½ weight percent, based on the weight of said refractory particles, of a binder, said binder having sufficient tackiness at an elevated temperature substantially above room temperature to bind the particles together and maintain such bond, said binder comprising tall oil pitch and from about 10 to about 90 weight percent, based on the total weight of said binder, of asphalt binder oil having a ring and ball melting point temperature within the range of from about 126° F. to about 153° F. and a maximum Conradson carbon content of about 25 weight percent.

6. The refractory composition of claim 5 in which said pitch is a tall oil pitch having an acid number within the range of from about 20 to about 75.

7. The composition of claim 6 in which said binder is approximately a 50–50 weight percent mixture of said tall oil pitch and said asphalt binder oil.

8. The composition of claim 3 in which said binder is approximately 25–75 weight percent asphalt binder oil, based on the total weight of the binder.

9. The composition of claim 8 in which the blown asphalt binder oil comprises asphalt and from about 5 to about 60 weight percent of cylinder lube stock.

10. The composition of claim 3 in which said binder remains tacky at temperatures in the range of about 150°–300° F.

11. A composition according to claim 1 in which said asphalt binder oil is air blown.

12. A refractory composition according to claim 5 in which said asphalt binder oil is air blown.

13. A composition according to claim 1 in which the asphalt binder oil comprises asphalt and from about 5 to about 60 weight percent of cylinder lube stock, said asphalt binder oil being air blown.

* * * * *